United States Patent Office 3,502,032
Patented Mar. 24, 1970

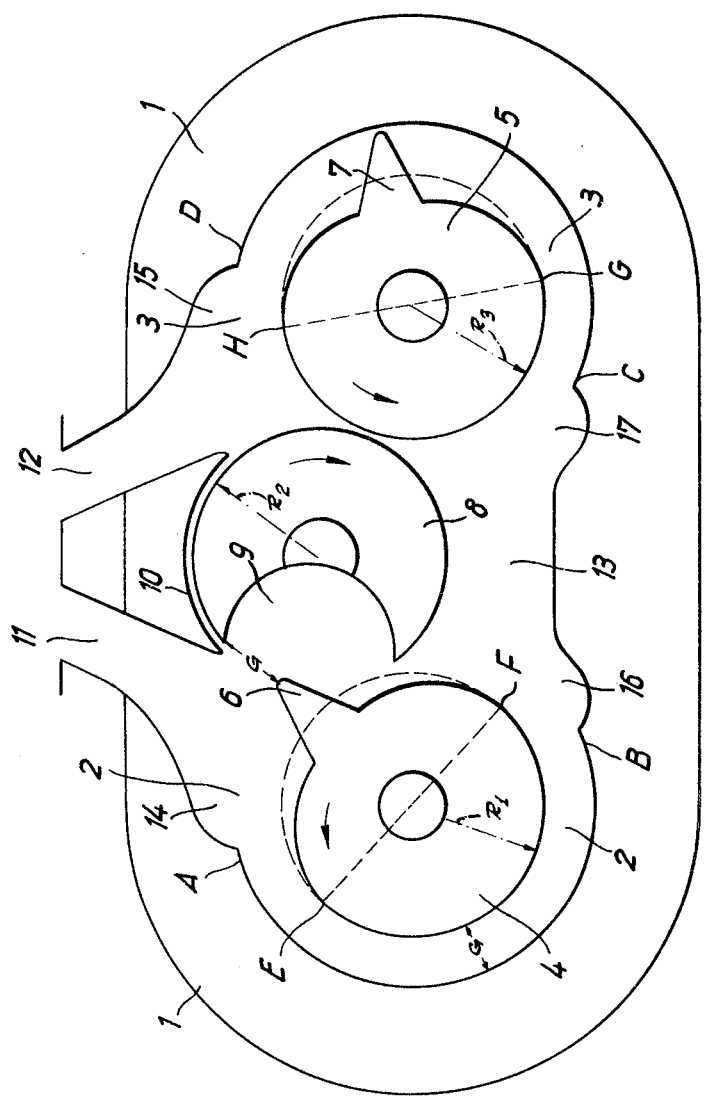

3,502,032
ROTARY PISTON MACHINES
Karl Lauer, Brandenburische Strasse 16,
Berlin-Wilmersdorf, Germany
Filed Mar. 28, 1968, Ser. No. 716,848
Int. Cl. F04c 1/06
U.S. Cl. 103—125                                 2 Claims

ABSTRACT OF THE DISCLOSURE

The invention concerns a rotary-piston machine which can be used either as a fluid pump or as a fluid-driven motor. The machine housing defines three cylinders in the two outer chambers of which piston hubs are mounted and in the central cylinder of which a blocking element is arranged. The pistons are so shaped relative to the blocking element that, when either of the piston hubs is in the part of its working cycle in which it is not performing any useful work, a gap is defined between the piston hub concerned and the blocking element such as to allow liquid to pass between these two elements. In this way a more smooth and uniform performance is achieved.

---

The invention relates to a rotary-piston machine having external shafts.

Machines of this kind are already known which have a housing which comprises an inner pumping chamber in the form of three cylinders of circular section which are arranged alongside one another and which mutually overlap, a blocking element being provided which has a cylindrical outer surface and a recess and which sealingly cooperates with the associated surface of the housing only in one region of the said blocking element. In the two outer cylinders of circular section pistons are arranged each of which has a piston hub and a tooth-like projection, a specified region of the piston hub sealingly cooperating with the cylindrical outer surface of the blocking element.

In operation of a machine of this kind the piston hubs and the blocking element sealingly roll on one another. This tight-sealing engagement is also maintained while the projections of the piston hubs are passing through the recess of the blocking element. This known form of construction entails serious drawbacks. While the projections are passing through the associated recess of the blocking element, abrupt or jerky motions occur which can have a deleterious effect on the performance of this machine. The provision of a tight seal between the blocking element and the piston hub, while the projection is passing through the recess of the blocking element, is thus an essential pre-requisite for proper operation of these known machines. While the projections are passing through the recess spaces are defined whose size varies, and (particularly when liquids are used) this leads to liquid surges which can appreciably reduce the efficiency of the machine, because the liquid medium can enter these spaces or leave the latter simply as a result of discontinuities in the tight-sealing connection between the projection and the blocking element and piston hub.

The invention has the object of providing a rotary-piston machine which—in addition to the favorable characteristics of the known machines of this general kind, namely the fact that they can be used as a motor or as a pump for liquids and gases and can operate in either direction of rotation as required and at any required speed—also runs smoothly and without abrupt or jerky motions and in each part of a single rotation or working cycle of the piston hubs results in a consistent and uniform performance. This means that, when the machine is used as a motor, a uniform driving power will be achieved by the smooth motion of the machine and in each phase of the working cycle thereof, whereas, when the machine is used as a pump, a constant rate of the fluid being pumped will be obtained and it will be impossible in any part of the said working cycle of the machine for this medium being pumped to freely pass between the inlet and the outlet openings.

This object is realised by virtue of the fact that, in a manner known per se, each piston hub comprises a cylindrical region of circular cross-section, which lies opposite the tooth-like projection and of a flattened region lying on both sides of the tooth-like projection, which flattened regions extended as far as the region of the hub having a cylindrical shape of circular cross-section; also, the angle of the piston hub included by the area of cylindrical shape of circular cross-section corresponds to the angle which is swept by the tooth-like projection while the latter is in tight-sealing contact with the inner surface of the machine housing; also, the recess of the blocking element is so formed that a distance is defined, when the tooth-like projection of the piston hub lies in the region of the recess, which corresponds at least to half the length or height of the tooth-like projection.

A further feature of the invention consists in the arrangement that the contour of the piston hub merges, on both sides of the projection, into a curve having a progressively increasing radius.

It is proposed—in a rotary piston machine having a blocking element and two piston hubs which are arranged in series and each of which has a projection on the piston hub—to so apportion the work to be performed between the two piston hubs that the projection of one of the hubs only sealingly rotates in engagement with the associated concavities in the cylinder of circular cross-section for an angle of rotation of slightly over 180° during the portion of the working cycle during which so-called useful work is performed, while the projection of the other piston hub is passing through the non-useful portion of its working stroke, which corresponds to an extent of angular rotation of somewhat less than 180° and which precedes the attainment of the said projection of the start of its useful working stroke. The hub of the piston and the blocking element thus only roll against one another in tight-sealing engagement while the projection is performing the useful portion of its working stroke. The hub is appreciably flattened from both ends of the cylindrical region thereof up to the projection, and does not sealingly engage the blocking element. As a result of practical application of the present invention it is possible to ensure that, firstly, the hub and the blocking element will only tight-sealingly roll over one another during the portion of the working stroke of the machine in which useful work is being performed and, secondly, that—while the hubs are being further rotated in the portion of their working stroke in which they are not performing useful work and which precedes the instant at which they commence the part of their working stroke in which useful work is performed—a space is defined between the hubs on the one hand and all the parts of the machine housing and of the blocking element on the other hand, which space is of a width sufficient to ensure that the driving medium can freely pass round the hubs and can at no point of the working cycle exert a pressure opposed to the working direction of the hubs.

Thus the machine enables both a smooth, non-jerky performance to be attained and also a uniform efficiency or performance of the machine in each phase of a single rotation of the piston hubs.

It is already known to provide a flattened portion on the piston hubs to either side of their projections and extending perpendicular to the central line of the projection.

In contradistinction to the arrangement proposed according to the present invention, this flattened portion is intended to improve the sealing effect between the piston hub and the blocking element. The object of the present invention cannot be attained by this known form of construction.

The sole figure of the drawing shows an embodiment of the proposed rotary piston machine, provided by way of example only, in elevational view, part of the cylinder wall being broken away.

In a housing 1 having an inner surface in the form of three cylinders of circular cross-section which lie alongside one another and which mutually overlap, a pair of piston hubs 4, 5 each having a tooth-like projection 6, 7 is arranged one in each of the two outer cylinders 2 and 3. The projections 6, 7 rotate in tight-sealing connection with portions of the housing 1 which define the wall of the cylinders 2, 3. In the central cylinder the portion 8 of circular cross-section of the blocking element rotates in tight-sealing engagement with the portion 10 of the surface of the housing between the inlet and the outlet ports 11, 12 lying on the same side of the housing 1.

This arrangement ensures that the cylinders 2, 3 will be reliably sealed off with respect to one another in the region in which the ports 11, 12 enter the machine housing. The cylinders 2, 3 communicate with one another by way of a channel 13 and are arranged in series. The parts 4, 5, 8 of the machine are arranged on parallel axles or shafts and rotate with one another in a manner known per se through a toothed wheel transmission or the like in directions indicated by the arrows. In addition, they are all of like radial dimensions, having radii $R_1$–$R_3$ as can be seen from the drawing. The two piston hubs 4, 5 are of similar construction and their cylinders form mirror images one of another.

When the projections 6, 7 are passing through the regions of the cylinders 2, 3 in which they perform useful work these teeth 6, 7 rotate over an angular distance of slightly more than 180°, which, in the case of projection 6, lies between points A and B and in the case of projection 7, extends from point C to point D; in the course of the said rotation the projections 6, 7 are in tight-sealing engagement with the housing surface of their associated cylinders 2, 3. The projections 6, 7 of the two hubs 4, 5 are so offset relative to one another that the projection 6 leaves the cylindrical concavity in which it performs useful work at B, as soon as projection 7 of hub 5 has just started, at C, to sealingly engage its associated concavity of the housing surface. The cylindrical surfaces of the piston hubs 4, 5 only roll against the blocking element 8 in tight-sealing engagement therewith, while these projections are passing through the area in which they perform useful work.

The outer surfaces of the piston hubs 4, 5 are only cylindrical within an angular distance (segment) of slightly over 180°, this area lying, in the case of hub 4, between points E and F and, in the case of hub 5, between points G and H. In the transition regions lying between E and F or G and H the piston hubs are of progressively decreasing radius in the direction towards their respective projections 6, 7. When the hubs are not moving through the area in which useful work is performed, a distance must be defined between each part of the piston hubs 4, 5 inclusive of the projections 6, 7, on the one hand, and each part of the blocking part 8 and of the housing 1 on the other hand which allows the liquid to flow through the area in which useful work is performed and also allows the driving liquid to pass through the region of the cylinder in which no useful work is performed. The width of this distance should correspond to at least half of the theoretical length of the projection, that is to say the length which the projection would have if the piston hubs were completely circular.

The recess 9 is constructed as large as possible. Its size is given an upper limit by the fact that the blocking element 8, while the machine is running, always ensures, together with the part 10 of the housing 1 against which the blocking element 8 engages in tight-sealing manner, a proper seal between the spaces of the two cylinders 2, 3 (and the spaces in close proximity with the latter) with respect to one another.

In the cylinder 1 the transitional area 14 of the inlet port 11 is widened up to point A and the transitional area 16 leading to the communicating channel 13 is widened from point B, while in cylinder 3 the region 15 adjacent the outlet port 12 is widened from point D and the inlet 17 of the communication channel 13 is widened as far as point C; these regions are widened to an extent such that the required minimal distance G of half the theoretical length of the projections is present between the piston hub together with its associated projection and all parts of the housing 1.

For clarification of the manner of operation of the above-described embodiment of the machine, let it be assumed that the machine illustrated in the figure operates as a liquid motor and that it is completely filled with liquid. In the position of the machine illustrated in the figure the liquid flows through the inlet opening into cylinder 2 and thence passes round the piston hub 4 on both sides thereof; as shown, this piston hub 4 has an associated projection 6. The liquid then passes through the channel 13 to cylinder 3. During this phase of the working cycle the blocking element 8 and the cylindrical segment portion of the piston hub 5 roll over one another in tight-sealing manner and prevent any flow-through of the driving medium at this point. The projection 7 is driven in the direction of the arrow subject to the pressure of the liquid. At the same time the projection 6 is also driven in the direction indicated by the arrow by means of a system which is known per se (e.g. through gear wheels). The projection 6 reaches point A immediately before the projection 7 reaches D. At the same time the blocking element 8 and the cylindrical segment of the piston hub 4 sealingly co-operate with one another at point F. The liquid which continues to flow into the housing presses the projection 6 from A to B in the direction of the arrow. The cylindrical segment of the piston hub 4 which now rolls against the blocking element 8 in tight-sealing contact therewith ensures that no driving medium can pass through at this point.

Projection 7 has, meanwhile, left at D the region of the cylinder 3 in which useful work is performed, and the piston hub 5 and the blocking element 8 are no longer in mutual contact from point H of the piston hub 5 so that the condition in cylinder 3 is now similar to that which is shown in the figure with respect to cylinder 2.

While in the further course of the working cycle the projection 7 moves past the blocking element 8 within the recess 9 of the latter and through the widened portion 15 of the intermediate or communicating channel 13 back to point C, the liquid which is thrust by projection 6, which is driven through the area of the cylinder 2 in which no useful work is performed (i.e. from A to B), passes through the intermediate or communicating channel and, past the piston hub 5, to the outlet opening 12. When the projection 7 reaches point C, the blocking element and the piston hub 5 start to roll on one another in tight-sealing manner between point G and H and projection 6 reaches, in the region of the cylinder 2 in which no useful work is performed, the position shown in the figure; at the same time the driving medium which flows from the inlet opening 11 to both sides of the piston hub 4, now only acts on projection 7. When the machine assumes the position shown in the figure the above-described working cycle is repeated.

If the same embodiment of the machine is used as a liquid pump, then its manner of operation can be readily followed from the drawing. The projections in the pump which are driven through the intermediary of the shafts act within the regions of the cylinder in which useful work is performed so as to suck in and thrust out the liquid which is to be pumped.

If it is desired to achieve a performance which is twice, or some other multiple, of a single rotary piston machine as proposed by the invention, this can be achieved by arranging two or more of such rotary piston machines in parallel; it is also possible if required to combine these machines so as to form a composite unit therefrom.

I claim:
1. A rotary-piston machine comprising:
   a housing formed with a chamber;
   a pair of geometrically similar pistons rotatable in said chamber about respective parallel spaced-apart axes and each including a piston hub and a radial tooth thereon, each of said teeth defining on rotation of the respective hub a circular orbit, said chamber having an inner wall conforming to a portion of each of said circular orbits, said hubs each being formed with a cylindrical arc segment centered on the respective axis and defining on rotation of the respective hub an inner circular path concentric with said orbit and lying therewithin, said teeth being each of greater radial length than the distance between said path and said orbit, said hubs each having a pair of convex arcuate transition regions to each side of the tooth between the tooth and the respective segment, each of said hubs being of increasing radius in said regions outwardly from the respective tooth; and
   a substantially cylindrical blocking element rollingly engageable with said segments and formed with a recess, each of said teeth being receivable with clearance in said recess, the radii of said segments and said element being substantially equal.

2. The machine defined in claim 1 wherein said inner wall sealingly conforms to a portion of said blocking element and is formed with a pair of substantially semi-cylindrical concavities partially receiving said pistons, said segments and said concavities having substantially equal arc length and extending over substantially 180° of arc, said hubs being of regularly increasing radius in said regions, said teeth each defining when received in said recess a gap therewith equal to at least half the length of the tooth, said housing being formed adjacent the edge of each concavity with a depression open toward the respective piston, each of said teeth being at least twice as long as said distance between said orbit and said path.

References Cited

UNITED STATES PATENTS

| | | | |
|---|---|---|---|
| 2,835,204 | 5/1958 | Richards | 103—125 |
| 2,835,229 | 5/1958 | Richards | 91—92 |
| 2,859,699 | 11/1958 | Billeter | 103—125 |
| 3,274,943 | 9/1966 | Berry | 103—125 |

DONLEY J. STOCKING, Primary Examiner

W. J. GOODLIN, Assistant Examiner